US008684056B2

(12) United States Patent
Gila et al.

(10) Patent No.: US 8,684,056 B2
(45) Date of Patent: Apr. 1, 2014

(54) PRINTING SYSTEMS AND METHODS

(75) Inventors: Omer Gila, Cupertino, CA (US); Napoleon J. Leoni, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 962 days.

(21) Appl. No.: 12/401,216

(22) Filed: Mar. 10, 2009

(65) Prior Publication Data

US 2010/0230038 A1 Sep. 16, 2010

(51) Int. Cl.

| | |
|---|---|
| ***B65C 11/02*** | (2006.01) |
| ***B29C 65/02*** | (2006.01) |
| ***B32B 37/02*** | (2006.01) |
| ***B32B 37/06*** | (2006.01) |
| ***B32B 37/10*** | (2006.01) |
| ***B32B 37/14*** | (2006.01) |
| ***B32B 38/14*** | (2006.01) |

(52) U.S. Cl.
USPC ........... 156/384; 156/387; 156/550; 156/581; 156/582; 156/583.1

(58) Field of Classification Search
USPC ............... 156/384, 387, 550, 581, 582, 583.1
See application file for complete search history.

(56) References Cited

U.S. PATENT DOCUMENTS

| | | | | |
|---|---|---|---|---|
| 3,101,275 | A | 8/1963 | Calms et al. | |
| 7,593,656 | B2 * | 9/2009 | Boness et al. | 399/49 |
| 2006/0011817 | A1 * | 1/2006 | Harush et al. | 250/221 |
| 2009/0015649 | A1 | 1/2009 | Keeton et al. | |

FOREIGN PATENT DOCUMENTS

| | | |
|---|---|---|
| EP | 1494086 | 1/2005 |

* cited by examiner

*Primary Examiner* — Sonya Mazumdar

(57) ABSTRACT

Systems and associated methods of printing using ink-jet technology and offset printing capabilities are provided. The method can comprise jetting an ink onto a printing blanket, where the ink comprises a carrier and a pigment colorant, and where the carrier substantially free of polymers. Additional steps include developing the ink to create a print image on the printing blanket; applying a layer of wetting fluid to a surface of a print medium, where the surface includes a coating comprising a polymer; heating the surface to a print-receptive temperature that is lower than the softening temperature of the polymer, causing softening of the polymer; and transferring the print image from the printing blanket to the surface.

10 Claims, 2 Drawing Sheets

PRINTING SYSTEMS AND METHODS

BACKGROUND

Liquid electrophotography has proven capable of providing high quality print images on a wide gamut of print media. Though the liquid electrophotography printer (LEP) is well known in the commercial printing arts, it may be useful to provide the quality and gamut of inherent in liquid electrophotography printers together with some of the benefits of ink-jet printing, such as scalability, speed, and relative simplicity of design. Furthermore, there would be an interest in achieving these performance profiles and ink properties while minimizing the environmental impact of such printing. A particularly attractive would be to minimize the number of consumables and volatile organic compounds that can be involved with such printing.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

DETAILED DESCRIPTION

Figure 1:
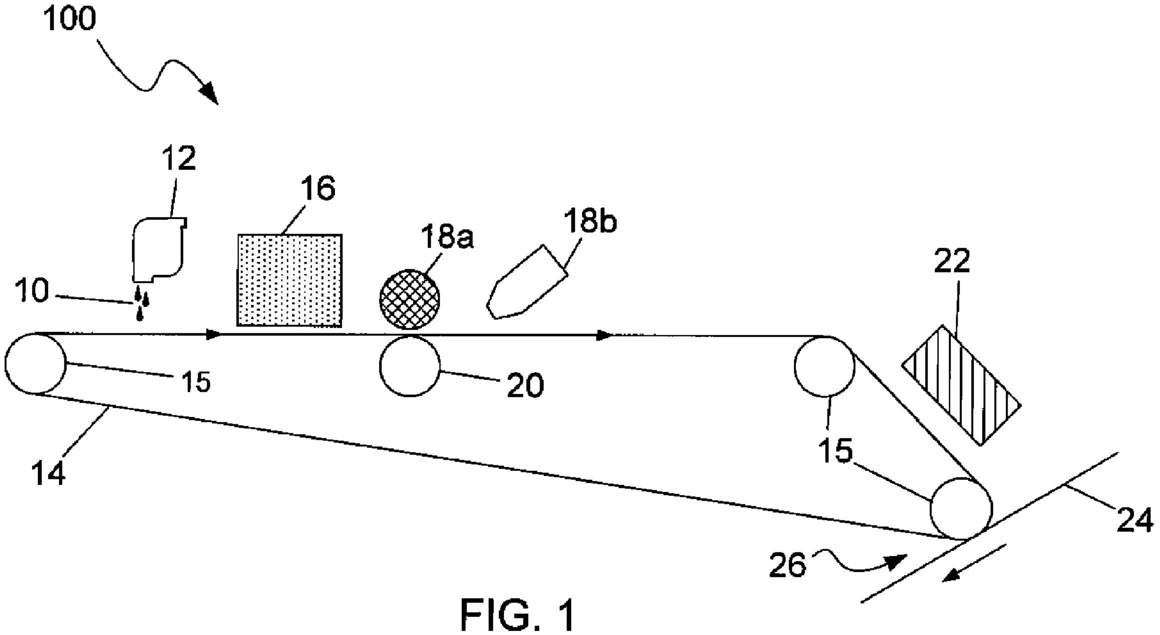
FIG. 1 is an side cross-sectional view of a printing system in accordance with an embodiment of the present invention.

Before the present invention is disclosed and described, it is to be understood that this disclosure is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

It must be noted that, as used in this specification and the appended claims, the singular forms "a," "an," and "the" include plural referents unless the context clearly dictates otherwise.

As used herein, "liquid vehicle," or "carrier" refers to the fluid in which the colorant of the present disclosure can be dispersed to form an ink. Typical liquid vehicles can include but are not limited to a mixture of a variety of different agents, such as surfactants, co-solvents, buffers, biocides, sequestering agents, compatibility agents, antifoaming agents, oils, emulsifiers, viscosity modifiers, and/or water, etc. In one embodiment, the "carrier" can be an oil or formulated oil-based liquid vehicle.

When referring to the "carrier" being "substantially free of polymer," it is understood that no polymer is specifically added to the carrier liquid. That being stated, in certain embodiments, the inks of the present disclosure can include polymer encapsulated or polymer-modified pigments where the polymer is covalently attached or otherwise coated on the surface of the pigment. Thus, to the extent that any polymer may be present in the carrier, it is only because of incidental or residual amounts of polymer being inadvertently removed from the surface of the pigment through normal use.

As used herein, "colorant" can include dyes and/or pigments.

As used herein, "pigment" generally includes pigment colorants. Additionally, pigments can be either standard pigment particles that are unmodified, or the pigments can be modified with small molecules or polymers (self-dispersed pigments) or can be polymer encapsulated pigments.

As used herein, "dye" refers to compounds or molecules that impart color to a liquid vehicle or compound incorporating the dye. As such, dye includes molecules and compounds that absorb electromagnetic radiation or certain wavelengths thereof. For example, dyes include those that fluoresce and those that absorb certain wavelengths of visible light.

As use herein, "ink-jet ink" generally refers to an ink having a liquid vehicle and a colorant, and optionally, other components such as binders, latexes, etc., and which are jettable from either thermal ink-jet pens or piezo ink-jet pens. In one embodiment, the ink-jet ink can be jettable from a thermal ink-jet pen.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

It is also noted that discussion of methods and systems herein can be interchangeable with respect to specific embodiments. In other words, specific discussion of a method herein is equally applicable to embodiments as they relate to the system, and vice versa.

With this background, it has been recognized that it would be advantageous to develop printing systems that provide certain benefits of offset printing technologies, as well as other benefits of ink-jet ink printing technologies. In accordance with this, a method of printing can comprise jetting an ink onto a printing blanket and developing the ink to create a print image on the blanket. The ink can comprise a carrier and a colorant, and the carrier can be substantially free of polymers. Additional steps include applying a layer of fluid to a surface of a print medium wherein the surface includes a coating comprising a polymer having a softening temperature; heating the surface to a print-receptive temperature where the heating causes softening of the polymer and the print-receptive temperature is lower than the softening temperature; and transferring the print image from the printing blanket to the surface.

In another embodiment, a system for printing can comprise an ink, a printing blanket, a paper medium, a wetting unit, a heating unit, and a transfer unit. The ink can include a carrier and a colorant, and the carrier can be substantially free of polymer. The printing blanket can be configured to receive a printed image formed by jetting the ink. The paper medium can include a surface coated with a polymer, wherein the polymer has a softening temperature. The wetting unit can be configured to apply a layer of fluid to the surface. The heating unit can be configured to heat the surface to a print-receptive temperature that softens the polymer, wherein the print-receptive temperature is lower than the softening temperature. As used herein, the term "print receptive temperature" refers to a temperature at which the yield strength of the polymer is lower than the stress exerted by the pigmented image during transfer, causing the pigment to be pressed into the polymer, i.e. the stress is higher than the elastic limit of the polymer. Also, the transfer unit can be configured to place the paper medium in contact with the printed image so that the printed image is transferred onto the surface.

Figure 2:
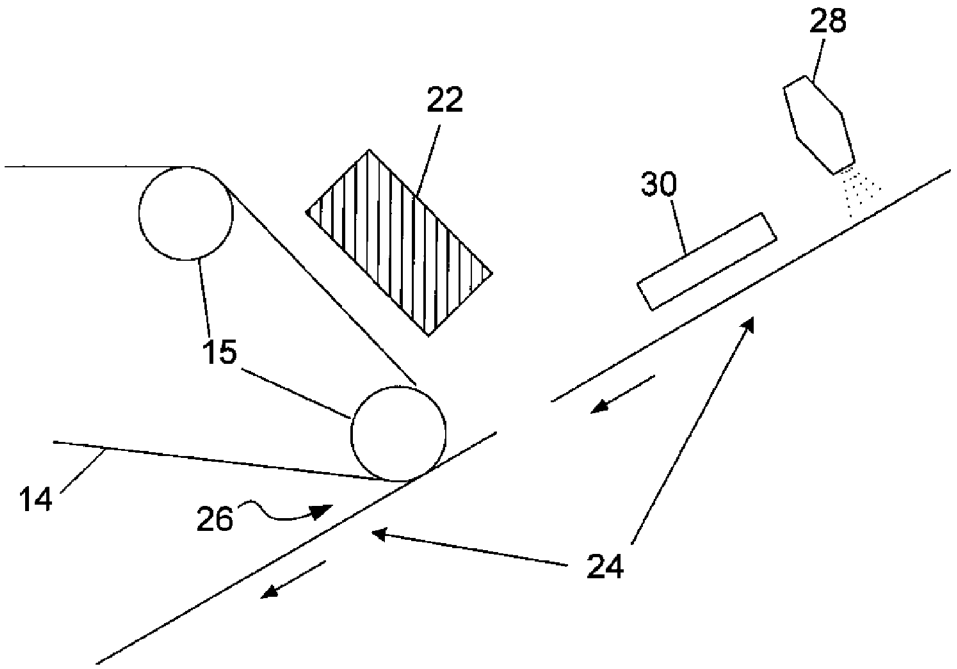
FIG. 2 is a close-up view of a subsection of the system of FIG. 1, further indicating print media treatment components.

In accordance with this, systems and methods for offset printing using jettable inks are disclosed. For example, FIGS. 1 and 2 provide an illustration of a system in accordance with a general embodiment. Such a printing system 100 can include an ink 10 comprising a carrier and a colorant. In one embodiment, the ink can include a oil carrier and a pigment colorant. A print head 12 used to jet the ink in accordance with the present embodiment may employ either a thermal or a piezoelectric jetting mechanism. The pigment may be encapsulated in or otherwise associated with polymer resins such as found in conventional inks. Alternatively, the ink may be a simple pigmented ink that lacks polymers. Such an ink can be more inexpensive as well as being more easily and reliably jetted, making the print head more stable. Accordingly in a particular embodiment, the carrier is substantially free of polymer, though the pigment colorant can be modified by a polymer (e.g., covalently attached or adsorbed on the surface). In a particular aspect, the pigment may include particles having a simple profile, such as substantially spherical. In another aspect, the pigment particles may range from 10 nm to about 500 nm. In either case the ink may include non-polymer additives to serve as dispersants, biocides, humectants, and the like. In one aspect, the ink may also include charge directors to facilitate electrostatic response. In an alternative aspect, the ink may lack charge directors.

The carrier may be chosen from any number of suitable conventional carriers for jettable pigmented inks. More particularly, the carrier may be chosen for particular characteristics for operation as disclosed herein such as low viscosity, low conductivity, high flash point, vapor pressure that provides for easy and rapid evaporation, or any combination of these. Specific non-limiting examples of carriers suitable for the embodiments disclosed herein include aliphatic hydrocarbon oils. Specific examples include ISOPAR oils G through L, Exxon Mobil Corp., Fairfax Va.). Other aliphatic oils may also be suitable, such as odourless mineral spirits, or any nonconductive isoparaffin.

This embodiment can further comprise a substrate configured to receive a printed image formed by jetting the ink. This can be a printing blanket 14, such as those that are used in LEP printing, and may be in the form of a belt supported by a plurality of rollers 15. Alternatively, the printing blanket may be disposed on a drum or plate. In a particular embodiment, the blanket may comprise a conductive material and may be electrically conductive as a structure. In a more particular embodiment, the blanket may comprise a conductive polyimide and an overlying conductive soft layer and non-conductive release layer. In one aspect, the blanket provides a non-swelling surface under typical operating conditions.

The present embodiment can also comprise a developing mechanism 16 configured for developing the ink once it has been jetted onto the printing blanket. In a particular embodiment, this can include a device for charging the ink, such as a charge corona. In embodiments using a resin-free ink without charge directors and with a non-conductive carrier, such a charging device can develop the ink by compressing the pigment particles to the blanket, thereby at least partially separating the pigment particles from the carrier.

The system may further comprise one or more mechanisms for removing excess carrier from the developed image on the blanket. Such a step can allow more rapid drying of the jetted ink. As such, a mechanism that can remove enough carrier so as to leave only a thin layer (e.g. less than 5 μm) may be particularly beneficial. In a particular embodiment, the mechanism can include a roller, or more particularly a reverse roller 18*a*. The roller may be electrically biased in embodiments where an ink with charge directors is used. Alternatively, a nonbiased roller may be used for ink without charge directors. To aid in making the remaining layer of carrier sufficiently thin, a particular support roller 20 may be situated under the blanket to provide slight counter pressure against the reverse roller.

In another particular embodiment, the mechanism for removing excess carrier may include a high speed air blowoff unit 18*b*. In a specific embodiment, such a unit includes an air knife. In still another embodiment, a roller and air blowoff unit may be used in combination. In yet another embodiment, either or both of these components may be combined with the particle developing unit to constitute a single station in the system. In still another embodiment, the system can further include an external drying unit 22. Each of these stations may be arranged so that the jetted ink layer encounters them in a desired sequence. In embodiments where the printing blanket is a belt, such as exemplified in FIG. 1, each station can be positioned at appropriate points along the belt's path. The belt may take an oblong path, or may alternatively have a more compact route, in which case some stations may be inverted so as to be situated as needed while reducing the space occupied by the system. Similarly, when the blanket is situated on a drum, each station may be positioned around its circumference.

Once a jetted ink image has been developed and dried, it can be transferred to a piece of print medium 24, such as paper. Accordingly, the system can further comprise a transfer unit configured to achieve this step. Such a unit may include conventional mechanisms used in transfer-based printing, e.g. a transfer nip 26 that brings the print medium into contact with the ink layer and facilitates transfer by exerting pressure and/or heat.

As mentioned in part, based on the components and approaches discussed above, a method of printing can comprise jetting the ink onto the printing blanket and then developing the ink by a developing mechanism such as described above. The method may further comprise removing excess carrier from the jetted ink by any of the above mechanisms, such as a roller, air blowoff unit, or other appropriate mechanisms known in the art. These may be employed in combination, either in serial sequence or in an overlapping sequence.

As also discussed above, the ink used in accordance with this embodiment can be relatively simple in that it can lack polymer components in the carrier. A substantially polymer-free carrier can be easier to make and can provide more reliable and consistent print head performance. However, polymers can often be useful in conferring durability to printed images by fixing them to the print medium and providing scratch resistance and water fastness. In accordance with the present method, polymer may be provided as uniform layer in the print substrate rather than in the ink composition. The coating may be done as a fabrication step in the paper mill. Alternatively, prefabricated paper may be coated with the polymer in a post-production step before printing. Still alternatively, the paper may be coated in an in-line step in the printing process and dried before being printed on.

With regard to the polymer on the print media, certain considerations can arise from such an approach. To provide the benefits discussed above it can be beneficial to employ paper coated with hard resin so that the printed surface can be sufficiently scratch resistant. In addition, harder resins can prevent paper sheets in a sheet pack from adhering to one another, and similarly can prevent adherence in a feeder roll used in a web press. However, a resin that is too hard may not receive pigments well and thereby result in ineffective transfer of the image. Alternatively, softer polymers tend to provide more successful image transfer, but can result in a less scratch resistant image.

To address this conflict, the present systems and methods can employ a print medium coated with one or more polymers that are hard enough to be durable. Accordingly, the coating can comprise polymers that are known in the printing arts to be suitable for coating print media. More particularly, the coating can include polymers having a hardness at room temperature that is sufficient to protect a printed image that has been incorporated into it. Non-limiting examples of polymers that may be used in accordance with this embodiment include traditional thermoplastic polymers used for dry toners, such as members of the acrylic acid and polystyrene families, as well as polymers similar to those used for latex paints, such as styrene butadiene-based polymers. Acrylics may also be suitable to this approach, and can provide an added advantage of lower cost.

In order to make the coating receptive to a pigment based image, the polymer coating can be softened just prior to image transfer. One approach for softening the polymer can be to heat the coating to a temperature that is within the softening range of the polymer. However, heating harder resins enough to soften them can be technically challenging. For example, sufficiently durable resins in accordance with the present embodiment may exhibit softening temperatures above about 120° C. In more particular embodiments, resins having softening temperatures from about 150° C. to about 250° C. may be used. Heating a piece of print medium to such temperatures can call for a significant amount of power. For example, heating a 12-inch wide, 100 μm thick two-side piece of paper to 200° C. can consume as much as 20 kW of power.

The present systems and methods provide a way to soften durable polymer coatings on print media while using less power. According to an embodiment, the printing systems and methods can include wetting the polymer in conjunction with heating. In a particular embodiment, the coating is wetted by applying a layer of fluid to its surface. The wetting fluid may be any fluid that is suited to be absorbed into the particular polymer so that the polymer is softened sufficiently to receive the image, and then may be evaporated or otherwise removed from the image after transfer. Non-limiting examples of suitable fluids include oils, aliphatic hydrocarbons, aromatic hydrocarbons, alcohols, and aqueous solvents. More particularly, the fluid may be applied in a thin and substantially uniform layer. Still more particularly, the fluid may be applied in a layer from about 0.2 μm to about 1.2 μm thick.

In a specific embodiment, the fluid used for wetting can be similar to that used in the ink carrier. In a more specific embodiment, the fluid used for wetting can be included in the carrier. In another embodiment, a different fluid having a lower vapor pressure may be used. In a non-limiting example of this approach, ISOPAR L oil may be used as the primary oil and ISOPAR M may be used for wetting. In any respect, the application of fluid may be done before the print medium is heated in one embodiment. In other embodiments, the application of wetting fluid and heating may be done simultaneously.

Wetting can serve to reduce the melting temperature of the polymer. Or even in the case of polymers having no clear melting temperature (e.g. thermoset polymers), this wetting can serve the purpose of lowering the temperature at which the yield point of the polymer is smaller than the pressures ensuing at the transfer nip so that pigments may be embedded into the polymer layer. As a result, the temperature at which the polymer becomes suitable for receiving print may be reduced, or even drastically reduced. In one aspect, the print-receptive temperature may be reduced by about 50° C. below the original softening temperature. In a more specific aspect, the reduction achieved may be about 90° C. or more. Therefore, significantly less heating can be employed in softening the polymer sufficiently to make it receptive to image transfer. In an illustrative example, a hard resin coating having a softening temperature of about 200° C. can be wetted with a fluid so that a subsequent heating to about 100° C. is sufficient to render it print-receptive. To enhance this effect, it may be beneficial to allow the oil to penetrate the resin for a time before commencing the heating step. In another particular embodiment, a combination of wetting fluid and resin may be used such that wetting causes the resin to soften sufficiently at around room temperature. In such an embodiment, the need for heating may be more drastically reduced or even eliminated.

The methods described herein notably provide the flexibility of using thermoplastic or thermoset resins in the polymer layer. When paired with the proper wetting fluid the polymer can absorb the fluid and become viscoelastic at a lower temperature than it would otherwise and yield under the transfer pressures to allow the pigment to become entrapped into the polymer. Thermoset resins are traditionally not used as binders, as once polymerized they often cannot form a film. However, the present embodiments can utilize a preformed polymer layer made out of a suitable low cost thermoset polymer such as styrene sutadiene rubber or even an epoxy. The approach embodied herein could soften this material enough to yield under the transfer nip pressures to accept the pigmented image without requiring the polymer to melt or fuse. Even thermoset polymers with relatively high softening temperatures (>200° C.), such as some silicone rubbers, might be used for high durability applications. In such a case the combination of a silicone rubber and an aliphatic or aromatic solvent can yield a swelling polymer layer that will soften readily but recover once the wetting fluid has been evaporated or removed.

Accordingly, an embodiment of the printing system as specifically shown in FIG. 2 can comprise a wetting unit 28 configured to apply a layer of oil to a surface of the print medium, as well as a heating unit 30 to heat the wetted polymer coating to a print-receptive temperature. The wetting unit may comprise a conventional mechanism or technique for uniformly applying liquids in printing, including spraying, inkjet, rollers, anilox, squeegee, and others. The system can further comprise a heating unit configured to heat the surface of the print medium to a print-receptive temperature. The unit may include any component suitable for uniformly heating the surface to the desired temperature, including but not limited to a hot fusing roller or infrared lamp. Due to the reduction in the print-receptive temperature, lower-power heat sources can be utilized than would be needed to soften the resin without wetting.

Figure 3:
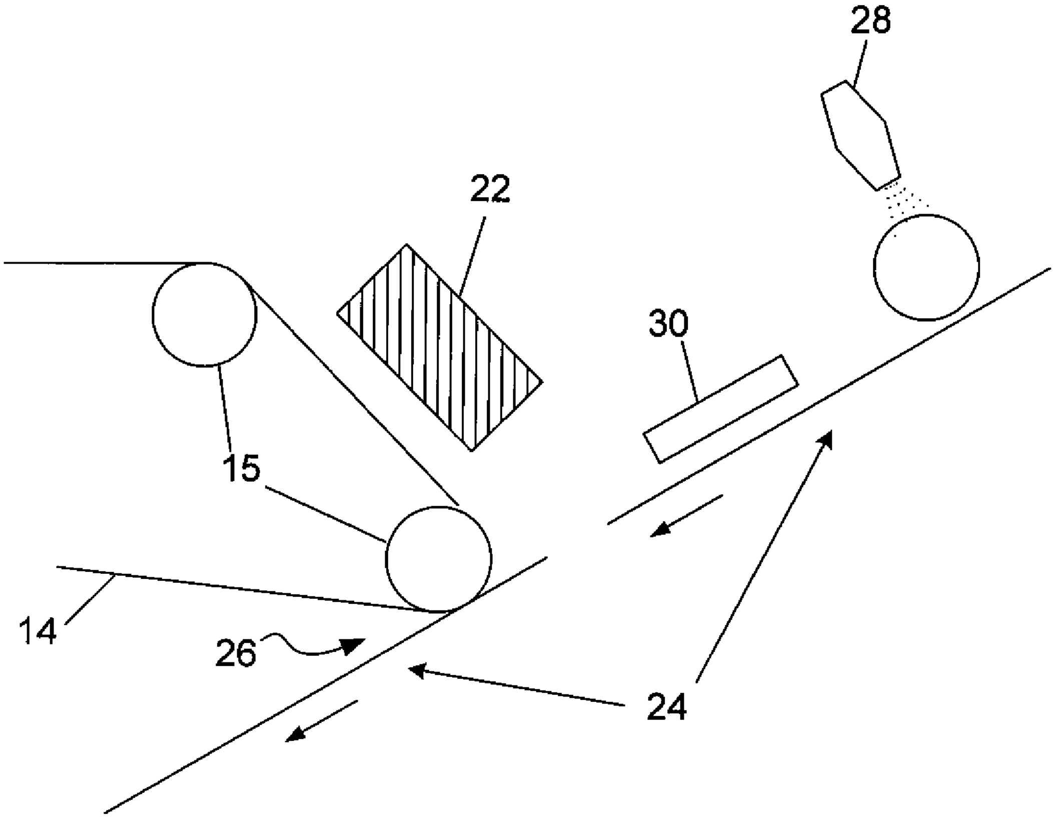
FIG. 3 is a close-up view of a subsection of another embodiment of the printing system.

In a particular embodiment, the wetting fluid may be heated prior to application to achieve an efficient means of heating the polymer. This may be accomplished in a number of ways in accordance with this embodiment. In a one aspect, the wetting unit is configured to heat the fluid before or during application. In a more particular embodiment as shown in FIG. 3, the wetting unit includes a roller 32, where the wetting fluid is supplied to the roller, which then applies the fluid to the paper. This roller may be functionally connected to a heating unit, so that the roller is heated and heats the fluid as it is applied. In another aspect, the roller may also heat the polymer on the paper and therefore serve as the sole heating unit for the paper or in addition to heating unit 30.

In one aspect, the heating unit may be situated in the system so that the wetting oil has a sufficient opportunity to penetrate the resin before the print medium encounters the heating unit. In another aspect of this, the heating unit may be situated close enough to the transfer unit so that the resin is still soft enough to receive pigment. In a particular embodiment, the heating unit may be included in the transfer nip itself. Such approaches can make it possible to heat the resin no more than necessary to achieve the desired softness, thereby further reducing the power requirements of the system.

Summarizing and reiterating to some extent, printing systems methods and are disclosed herein that provide inkjet printing with simple inks, while also providing good print image quality and durability. These embodiments can involve the use of print media that include polymer coatings. The embodiments herein also achieve these results while reducing the power demands that can accompany transfer printing on durable media.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A system for printing, comprising:

an ink comprising a carrier and a colorant, said carrier being substantially free of polymer;

a printing blanket configured to receive a printed image formed by jetting the ink;

a paper medium having a surface coated with a polymer, wherein said polymer has a softening temperature;

a wetting unit configured to apply a layer of wetting fluid to the surface;

a heating unit configured to heat the surface to a print-receptive temperature that softens the polymer, wherein the print-receptive temperature is lower than the softening temperature; and a transfer unit configured to place the paper medium in contact with the printed image so that the printed image is transferred onto the surface.

2. The system of claim 1, wherein the softening temperature is from about 150° C. to about 250° C.

3. The system of claim 1, wherein the print-receptive temperature is from about 50° C. to about 90° C. lower than the softening temperature.

4. The system of claim 1, wherein the wetting unit is configured to heat the wetting fluid.

5. The system of claim 1, wherein the wetting unit comprises a roller.

6. The system of claim 1, wherein the wetting fluid is included in the carrier.

7. The system of claim 1, wherein the heating unit is included in the transfer unit.

8. The system of claim 1, further comprising a removal unit configured to remove excess carrier from the surface.

9. The system of claim 1, wherein the polymer is selected from the group consisting of acrylic acid based polymers, polystyrene based polymers, styrene butadiene acrylics, styrene butadiene rubbers, silicone rubbers, and combinations thereof.

10. The system of claim 1, wherein the polymer is selected from thermoset polymers and thermoplastic polymers.

* * * * *